United States Patent [19]

Ishimatsu

[11] Patent Number: 5,612,935
[45] Date of Patent: Mar. 18, 1997

[54] APPARATUS AND METHOD FOR CONTROLLING THE POSITION OF AN OPTICAL PICKUP DEVICE IN A RECORDING/REPRODUCING APPARATUS FOR A DISC-SHAPED RECORDING MEDIUM

[75] Inventor: Yoshikazu Ishimatsu, Kanagawa, Japan

[73] Assignee: Sony Corporation, Tokyo, Japan

[21] Appl. No.: 514,142

[22] Filed: Aug. 11, 1995

[30] Foreign Application Priority Data

Aug. 15, 1994 [JP] Japan ................................. 6-191448

[51] Int. Cl.$^6$ ........................................................ G11B 7/09
[52] U.S. Cl. ...................................... 369/44.14; 369/44.22
[58] Field of Search .............................. 369/44.14, 44.15, 369/44.21, 44.22, 112, 44.16, 44.32; 359/813, 814, 823, 824

[56] References Cited

U.S. PATENT DOCUMENTS

| | | | |
|---|---|---|---|
| 5,343,447 | 8/1994 | Okabe et al. | 369/44.15 X |
| 5,381,273 | 1/1995 | Goda | 359/827 |
| 5,392,273 | 2/1995 | Masaki et al. | 369/116 X |
| 5,493,546 | 2/1996 | Kasahara | 369/44.14 X |

FOREIGN PATENT DOCUMENTS

| | | |
|---|---|---|
| 0326246A2 | 8/1989 | European Pat. Off. . |
| 0407215A2 | 1/1991 | European Pat. Off. . |
| 0546543A2 | 6/1993 | European Pat. Off. . |

Primary Examiner—Thang V. Tran
Attorney, Agent, or Firm—William S. Frommer; Alvin Sinderbrand

[57] ABSTRACT

A recording/reproducing apparatus for a disc-shaped recording medium having a driving motor for running a disc-shaped recording medium in rotation, an optical pickup device and a chassis member carrying the optical pickup device for shifting the optical pickup device across the inner and outer peripheral portions of the signal recording region of the disc-shaped recording medium via a guide shaft and a guide member. The chassis member has a stop member abutted by the reference surface of the mounting base when the reference surface of the mounting base is abutted against the stop member for stopping the shifting of the optical pickup device. When the optical pickup deice has been moved to the inner most portion of the disc-shaped recording medium, the optical pickup device may be stopped highly accurately. In addition, the read-out start position for the disc-shaped recording medium may be detected highly accurately.

6 Claims, 6 Drawing Sheets

APPARATUS AND METHOD FOR CONTROLLING THE POSITION OF AN OPTICAL PICKUP DEVICE IN A RECORDING/REPRODUCING APPARATUS FOR A DISC-SHAPED RECORDING MEDIUM

BACKGROUND OF THE INVENTION

This invention relates to a recording/reproducing apparatus for writing and/or reading out information signals on or from a disc-shaped recording medium, such as a read-only optical recording medium, known as a CD-ROM, an overwrite type optical recording medium or an optical recording medium which may be overwritten by light modulation or magnetic field modulation.

In a recording/reproducing apparatus, such as an optical disc player, a disc-shaped recording medium, referred to herein as an optical disc, is employed as an optical recording medium for information signals. Information signals are recorded on or reproduced from the signal recording area of the optical disc.

Among various sorts of optical discs, there is a special type CD-ROM, that is CD-R, having a signal recording area for writing information signals on the inner peripheral portion of the signal recording region of the disc. The CD-R has a signal recording area, about 1.8 mm in width, on a further inner side of the inner most portion of the signal recording region of the common CD-ROM. Consequently, with the recording/reproducing apparatus for the CD-R, it is necessary to move an optical pickup device towards a further inner side by about 1.8 mm than in the case of the CD-ROM.

Figure 1:
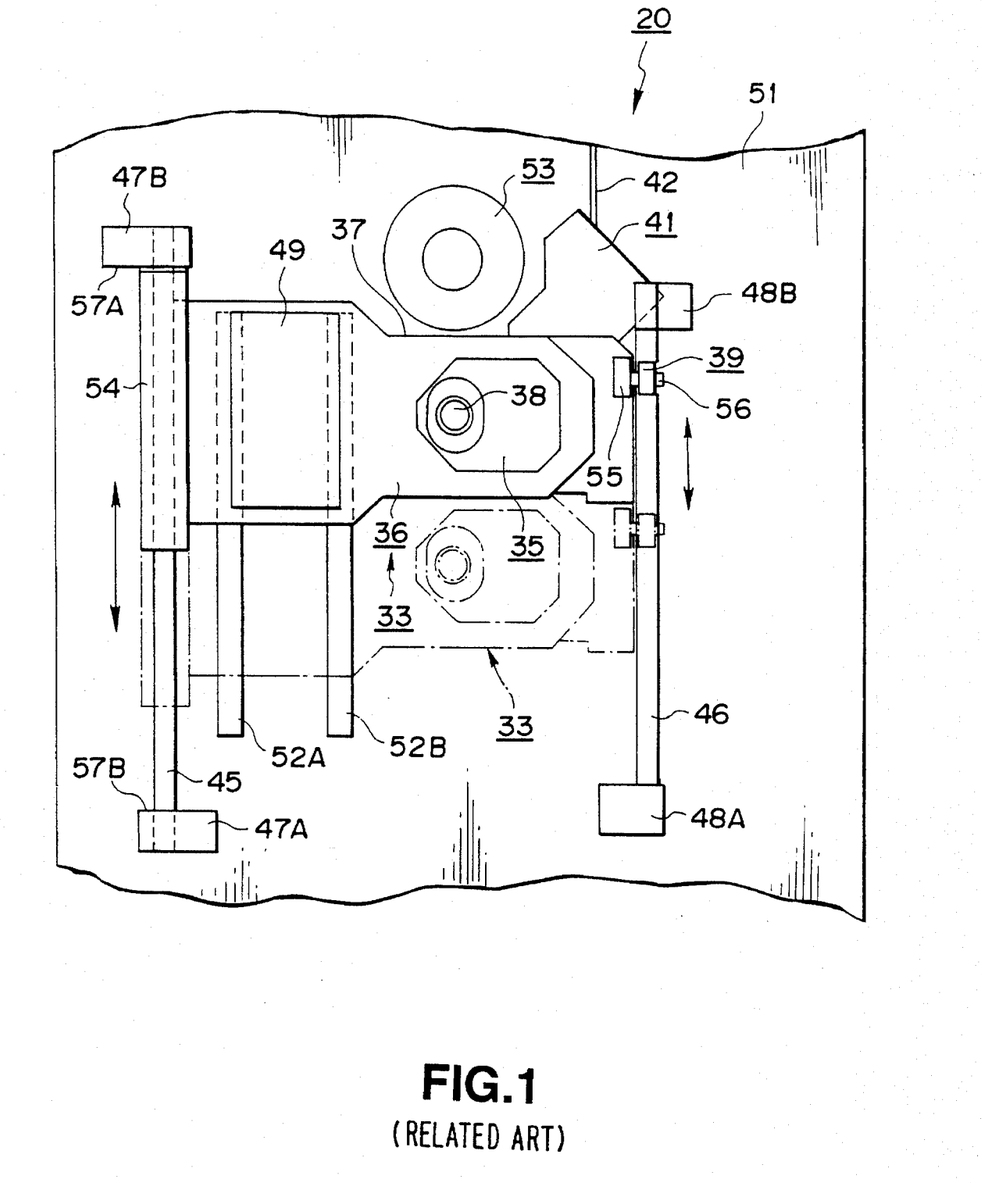
FIG. 1 is a plan view showing a conventional recording/reproducing apparatus for an optical disc.
Figure 2:
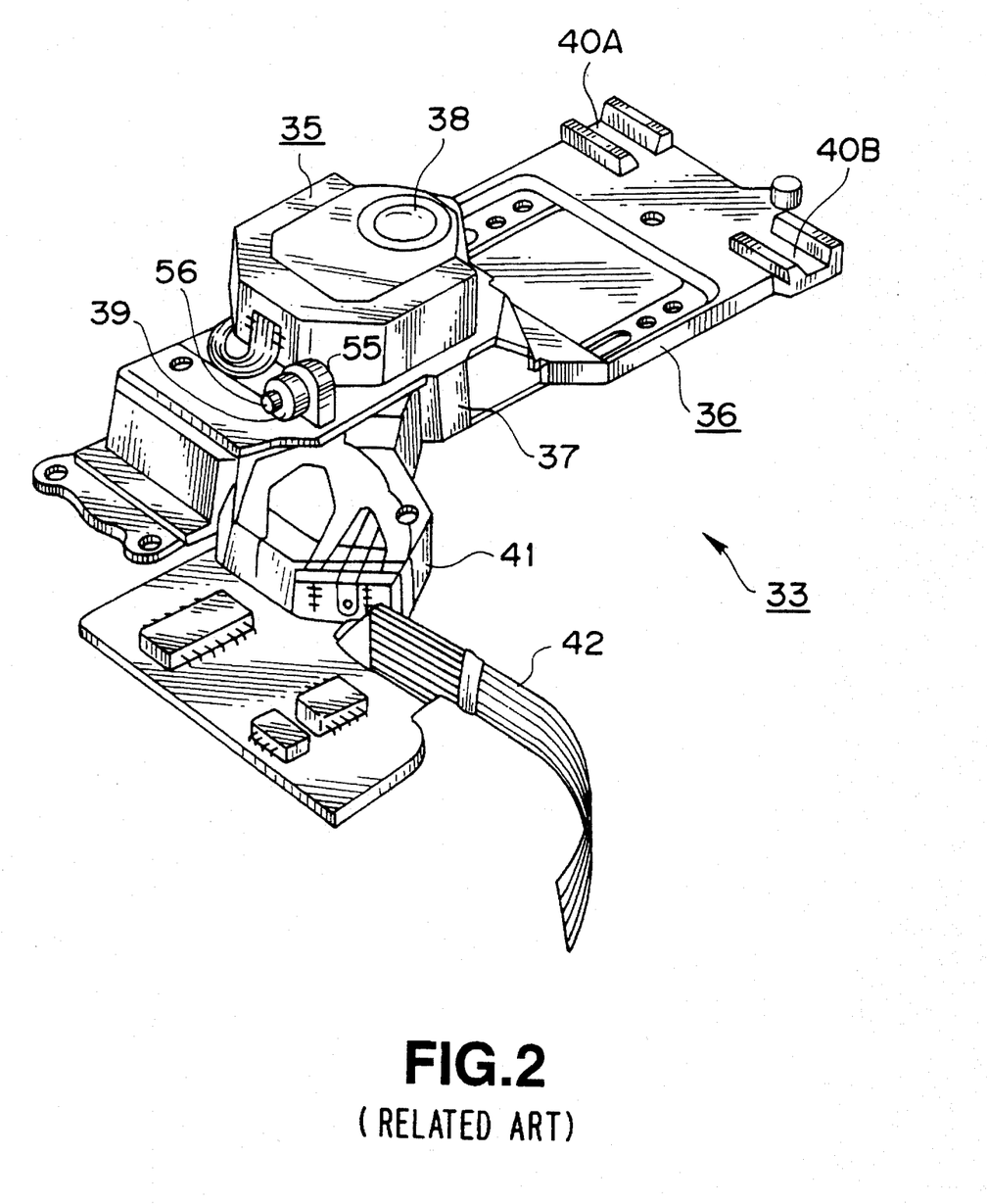
FIG. 2 is a perspective view showing an optical pickup device employed in the conventional recording/reproducing apparatus for the optical disc.

Referring to FIGS. 1 and 2, a recording/reproducing apparatus 20 proposed by the present assignee is now explained. The recording/reproducing apparatus 20 for the optical disc has an optical pickup 33 for moving an objective lens 38 provided on a bobbin 35 with respect to the signal recording region of the optical disc.

The recording/reproducing apparatus 20 for the optical disc is roughly comprised of the optical pickup device 33, and a guide shaft 45 and a guide member 46 for assembling the optical pickup device 33. The apparatus 20 also includes a spindle motor 53 for running the optical disc in rotation, and a chassis member 51 carrying the guide shaft 45, guide member 46 and the spindle motor 53.

The optical pickup device 33 includes the objective lens 38, the bobbin 35 carrying the objective lens 38 and a mounting base 36 carrying the bobbin 35. The optical pickup device also includes a driving part 41 assembled on the mounting base 36, and the guide shaft 45 and the guide member 46 mounted on the chassis member 51 carrying the optical pickup device 33.

The chassis member 51 has a first supporting member 47A and a second supporting member 47B between which are carried both ends of the guide shaft 45. The chassis member 51 also has a first supporting member 48A and a second supporting member 48B between which are carried both ends of the guide member 46 so that the guide member runs parallel to the guide shaft 45. The optical pickup device 33 is slidably mounted on the guide shaft 45 and the guide member 46.

The mounting member 36 is formed of a metal material in a substantially rectangular shape and carries a bobbin 35 on its major surface. The mounting base 36 has sleeve mounting portions 40A, 40B as-one with its one end portion, and a sleeve member 54 is mounted on theses sleeve mounting portions 40A, 40B. The mounting base 36 is slidably mounted on the guide shaft 45 via the sleeve member 54.

The mounting base 36 has on its opposite end a lug 55 adjacent to the bobbin 35 and a supporting shaft 56 is provided on a lateral surface of the lug 55. The supporting shaft 56 rotatably carries a roll bearing 39 by means of which the mounting base 36 is slidably mounted via the roll bearing 39 on the guide member 46.

The mounting base 36 carries, on its lateral surface, a driving circuit 41 for driving the bobbin 3. The driving circuit 41 is connected to a power supply section, not shown, via a flexible cable 42. The mounting base 36 has an electro-magnetic floating unit 48 adjacent to the guide shaft 45, and a magnetic force is generated in the electro-magnetic floating unit 48 by the electric power furnished from the driving circuit 41. The chassis member 51 is provided with a first magnet member 52A and a second magnet member 52B parallel to the guide shaft 45.

That is, the optical pickup device 33 is moved in a state of being floated under a repulsive force generated by a magnetic force generated by the electro-magnetic driving unit 48 and a magnetic force generated by the first magnet member 52A and the second magnet member 52B provided in register with the electro-magnetic floating unit 48.

The bobbin 35 has the objective lens 38 and is flexibly supported by a hi-axial actuator. That is, the bobbin 35 has means for adjustment in the track direction, that is in a direction parallel to the signal recording region of the optical disc, and means for adjustment in a direction normal to the signal recording region.

With the above-described recording/reproducing apparatus 20 for the optical disc, the operation of moving the optical pickup device 33 for reading out information signals of the optical disc is now explained. The mounting base 38 is supported by the guide shaft 45 and by the guide member 46 while the mounting base 36 is floated by the electro-magnetic floating unit 48. The mounting base 36 is moved via the sleeve member 54 along the guide shaft 45 and the guide member 46.

By such movement of the mounting member 36, the optical pickup device 36 is moved along the radius of the optical disc for reading out and reproducing information signals on the optical disc. The optical pickup device 33 is halted when it is moved as far as the inner most portion of the signal recording region of the optical disc and the sleeve member 54 provided on the mounting base 36 has its one end abutted against an abutment 57A.

The optical pickup device 33 is also halted when it is moved as far as the outer most portion of the signal recording region of the optical disc and the sleeve member 54 provided on the mounting base 36 has its one end abutted against an abutment 57B. That is, with the recording/reproducing apparatus 20 for the optical disc, the range of movement of the optical pickup device 33 is delimited by the abutments 57A and 57B.

In addition, with the present recording/reproducing apparatus 20 for the optical disc, the objective lens 38 has its optical axis positioned with respect to the mounting base 36, when mounting the optical pickup 33, by way of effecting alignment adjustment. This alignment adjustment of the optical axis of the bobbin 35 is explained by referring to FIG. 2.

With the bobbin 35 being mounted on the mounting base 36, the sleeve member 54 of the mounting base 36 is mounted on the guide shaft 45. In this state, alignment adjustment, such as skew adjustment, is carried out for adjusting the tilt of the objective lens 38 with respect to the major surface, which is a signal recording region of the optical disc, with a lateral surface thereof adjacent to the optical axis of the objective lens 38 as a reference surface 37. Consequently, with the alignment-adjusted optical pickup device 33, an extremely precise relative position is maintained between the reference surface 37 and the optical axis of the objective lens 38.

With the above-described optical pickup device 33, it is necessary to prohibit the optical pickup device 33 from being abutted against a winding coil, not shown, provided on the spindle motor 53 adapted for running the optical disc in rotation, when the optical pickup device is moved towards the inner peripheral portion of the signal recording region of the optical disc. Thus the present optical pickup device 33 has its range of movement restricted so that, when it is moved towards the inner periphery of the signal recording region of the optical disc, it is halted ahead of the spindle motor 53.

That is, the optical pickup device 33 is provided with the abutment 57A in the vicinity of one end of the guide shaft 45 for restricting the sphere of movement thereof along the guide shaft 45 and the guide member 46. The optical pickup device 33 is halted by the sleeve member 54 provided on the mounting base 36 slid along the guide shaft 45 being abutted against the abutment 57A.

There is also known a method for halting the optical pickup device 33 by utilizing one lateral surface of the mounting base 36, that is by this lateral surface being caused to bear against an abutment provided on the chassis, as disclosed in U.S. Ser. No. 08/1252,069, filed on Jun. 1, 1994 as a continuation of U.S. Ser. No. 07/989,356 filed on Dec. 11, 1992, now abandoned, corresponding to EP Application 546,543, published on Jun. 13, 1994. However, with the above-described methods, it is difficult to maintain a correct relative position between the optical axis of the objective lens 38 of the optical pickup device 33 and the abutment 57A, such that a significant error tends to be produced in this relative position.

OBJECT AND SUMMARY OF THE INVENTION

It is therefore a principal object of the present invention to provide a recording/reproducing apparatus for a disc-shaped recording medium in which, when the optical pickup device has been moved to the inner most portion of the disc-shaped recording medium, the optical pickup device may be stopped with high precision, and in which it is possible to detect the read-out start position for the disc-shaped recording medium highly accurately.

The recording/reproducing apparatus for a disc-shaped recording medium according to the present invention has a driving motor for running a disc-shaped recording medium in rotation, and an optical pickup device having an objective lens. The recording/reproducing apparatus also has a bobbin having the objective lens assembled thereon, and a mounting base having a reference surface parallel to the optical axis for adjusting the array and tilt of the optical axis of the objective lens. The recording/reproducing apparatus also has a driving part for driving the mounting base, and a chassis member carrying the optical pickup device for shifting the optical pickup member across the inner and outer peripheral portions of the signal recording region of the disc-shaped recording medium via a guide shaft and a guide member. The chassis member has a stop member abutted by the reference surface of the mounting base when the reference surface of the mounting base is abutted against the stop member for stopping the shifting of the optical pickup device.

The reference surface is used as means for detecting the inner most peripheral portion of the signal recording region of the disc-shaped recording medium by abutting against a stop member provided on a chassis member and as position reference for starting movement of the optical pickup device from the stop member towards a readout start position of reading out information signals from the disc-shaped recording medium.

The reference surface is provided at a position of the mounting base which intersects a line interconnecting the center of rotation of the driving motor and the optical axis of the object lens mounted on the bobbin.

The reference surface acts as an actuating part for retracting a lug adapted for actuating a position detecting unit detecting the position of the mounting base.

The stop member is provided in the vicinity of the outer periphery of a driving motor.

With the recording/reproducing apparatus for a disc-shaped recording medium according to the present invention, the reference surface provided on the mounting base so as to be employed for adjusting the array and the tilt of the optical axis of the objective lens when mounting the objective lens on the mounting base is caused to bear against the stop member provided on the chassis member for stopping the movement of the optical pickup device. The position of abutment of the stop member of the chassis member against the reference surface provided on the mounting base acts as position reference of starting the movement of the optical pickup device with respect to the signal recording region of the disc-shaped recording medium, thus assuring highly reliable position detection of the optical pickup device.

In other words, with the recording/reproducing apparatus for a disc-shaped recording medium according to the present invention, since the optical pickup device starts its movement with the position of abutment of the stop member provided on the chassis member against the reference surface provided on the mounting base as the position reference, the readout start position for the disc-shaped recording medium may be detected with improved accuracy.

DESCRIPTION OF THE PREFERRED EMBODIMENT

Referring to FIGS. 3 to 6, a recording/reproducing apparatus for the disc-shaped recording medium according to a preferred embodiment of the present invention will be explained in detail. The recording/reproducing apparatus for the disc-shaped recording medium, shown in general by reference numeral 1, employs a read-only optical recording medium having a write area in a portion of the inner most periphery thereof (CD-R; referred to herein as an optical disc). The recording/reproducing apparatus for the disc-shaped recording medium is of substantially the same configuration as the conventional recording/reproducing apparatus for the optical disc and includes an optical pickup device 3 for shifting an objective lens 8 configured for reading out information signals with respect to a signal recording region of the optical disc.

Figure 3:
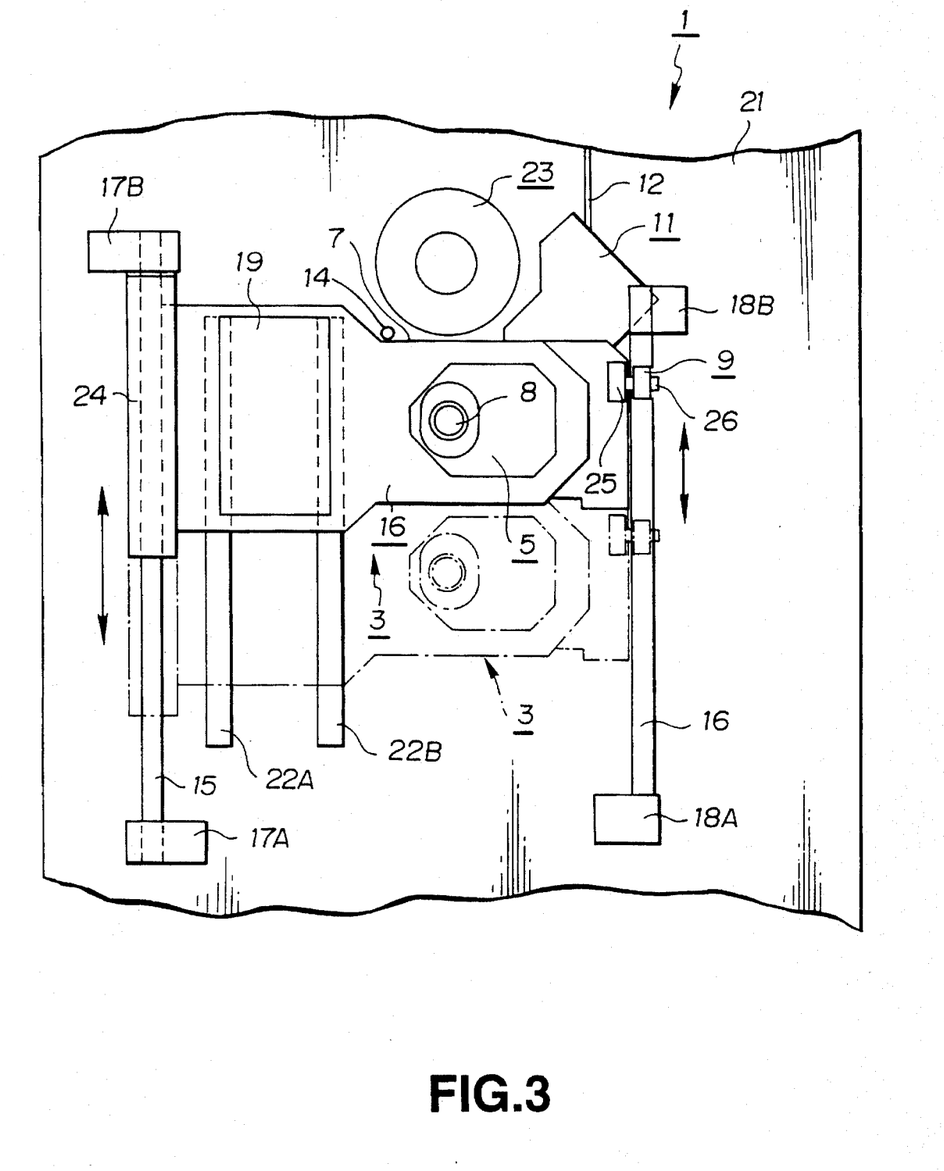
FIG. 3 is a plan view showing a recording/reproducing apparatus for an optical disc according to the present invention.
Figure 4:
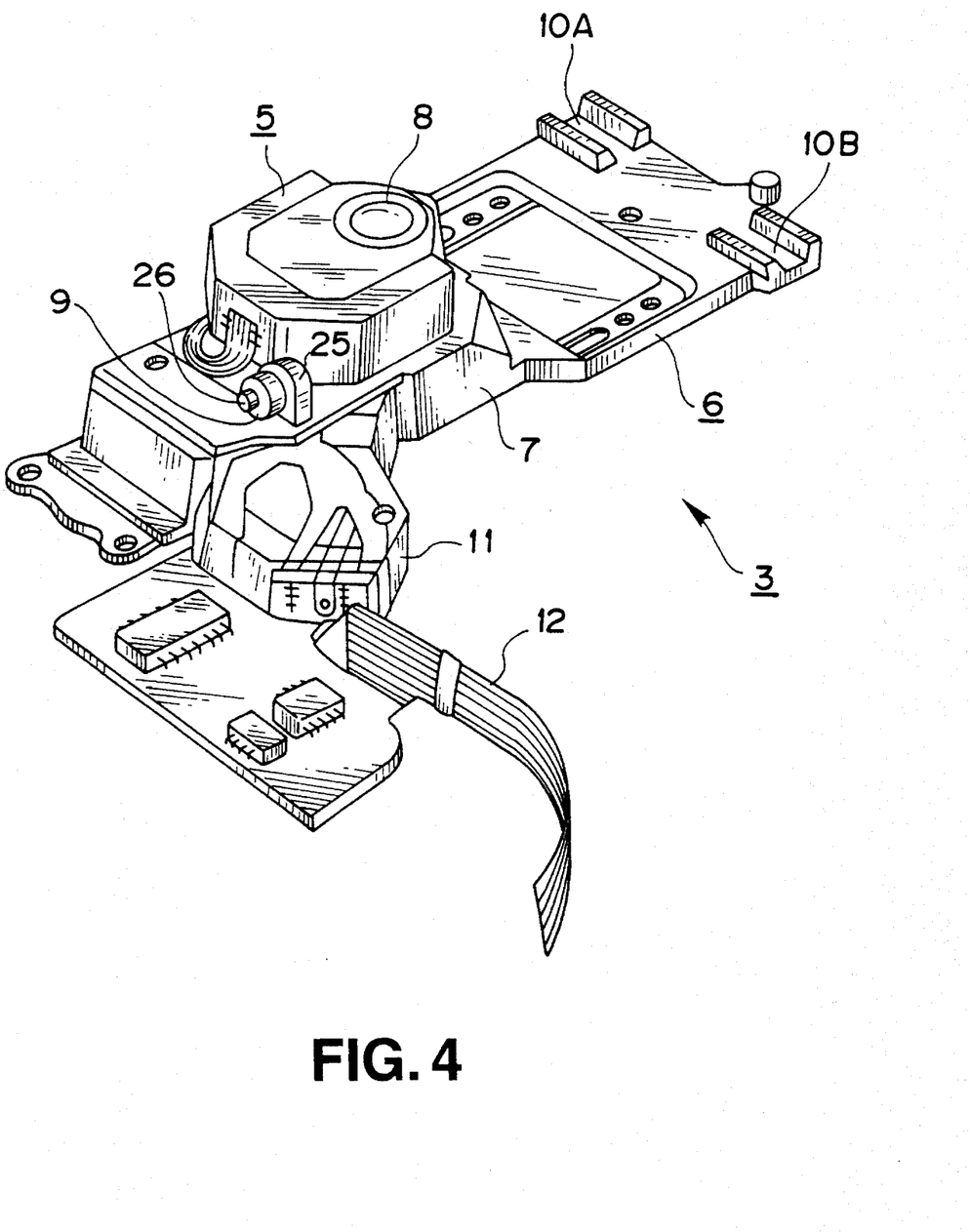
FIG. 4 is a perspective view showing an optical pickup device employed in the recording/reproducing apparatus for an optical disc shown in FIG. 3.

The recording/reproducing apparatus i for the optical disc is roughly comprised of the optical pickup device 3, and a guide shaft 15 and a guide member 16 for assembling the optical pickup device 3. The apparatus 1 also includes a spindle motor 23 for running the optical disc in rotation, and a chassis member 21 carrying the guide shaft 15, guide member 16 and the spindle motor 23.

The optical pickup device 3 includes the objective lens 8, a bobbin 5 carrying the objective lens 8 and a mounting base 6 carrying the bobbin 5, as shown in FIG. 3. The optical pickup device also includes a driving part 11 assembled on the mounting base 6, and the guide shaft 15 and the guide member 16 mounted on the chassis member 21 carrying the optical pickup device 3.

The chassis member 21 has a first supporting member 17A and a second supporting member 17B between which are carried both ends of the guide shaft 15. The chassis member 21 also has a first supporting member 18A and a second supporting member 18B between which are carried both ends of the guide member 16 so that the guide member runs parallel to the guide shaft 15. The optical pickup device 3 is slidably mounted on the guide shaft 15 and the guide member 16.

The mounting member 6 is formed of metal material in a substantially rectangular shape and carries a bobbin 5 on its major surface. The mounting base 6 has sleeve mounting portions 10A, 10B as-one with its one end portion, and a sleeve member 24 is provided on theses sleeve mounting portions 10A, 10B. The mounting base 6 is slidably mounted on the guide shaft 15 via the sleeve member 24.

The mounting base 6 has on its opposite end a lug 25 adjacent to the bobbin 5 and a supporting shaft 26 is provided on a lateral surface of the lug 25. The supporting shaft 26 rotatably carries a roll bearing 9 by means of which the mounting base 6 is slidably mounted via the roll bearing 9 on the guide member 16.

The mounting base 6 carries, on its lateral surface, a driving circuit 11 for driving the bobbin 5. The driving circuit 11 is connected to a power supply section, not shown, via a flexible cable 12. The mounting base 6 has an electromagnetic floating unit 19 adjacent to the guide shaft 15, and a magnetic force is generated in the electro-magnetic floating unit 19 by the electric power furnished from the driving circuit 11. The chassis member 21 has a first magnet member 22A and a second magnetic member 22B lying parallel to the guide shaft 15.

That is, the optical pickup device 3 is moved in a state of being floated under a repulsive force generated by a magnetic force generated by the electro-magnetic driving unit 19 and a magnetic force generated by the first magnet member 22A and the second magnet member 22B provided in register with the electro-magnetic floating unit 19.

The mounting base 6 also has, on its lateral surface facing the spindle motor 23, a reference surface 7 extending in a direction normal to the sliding direction of the mounting base 6 parallel to the optical axis of the objective lens 8 mounted on the bobbin 5. The reference surface 7 serves as a reference plane for optical axis alignment and skew adjustment operations in the course of the assembling process for the optical pickup device 3 for mounting the bobbin 5 on the mounting base 6.

Figure 5:
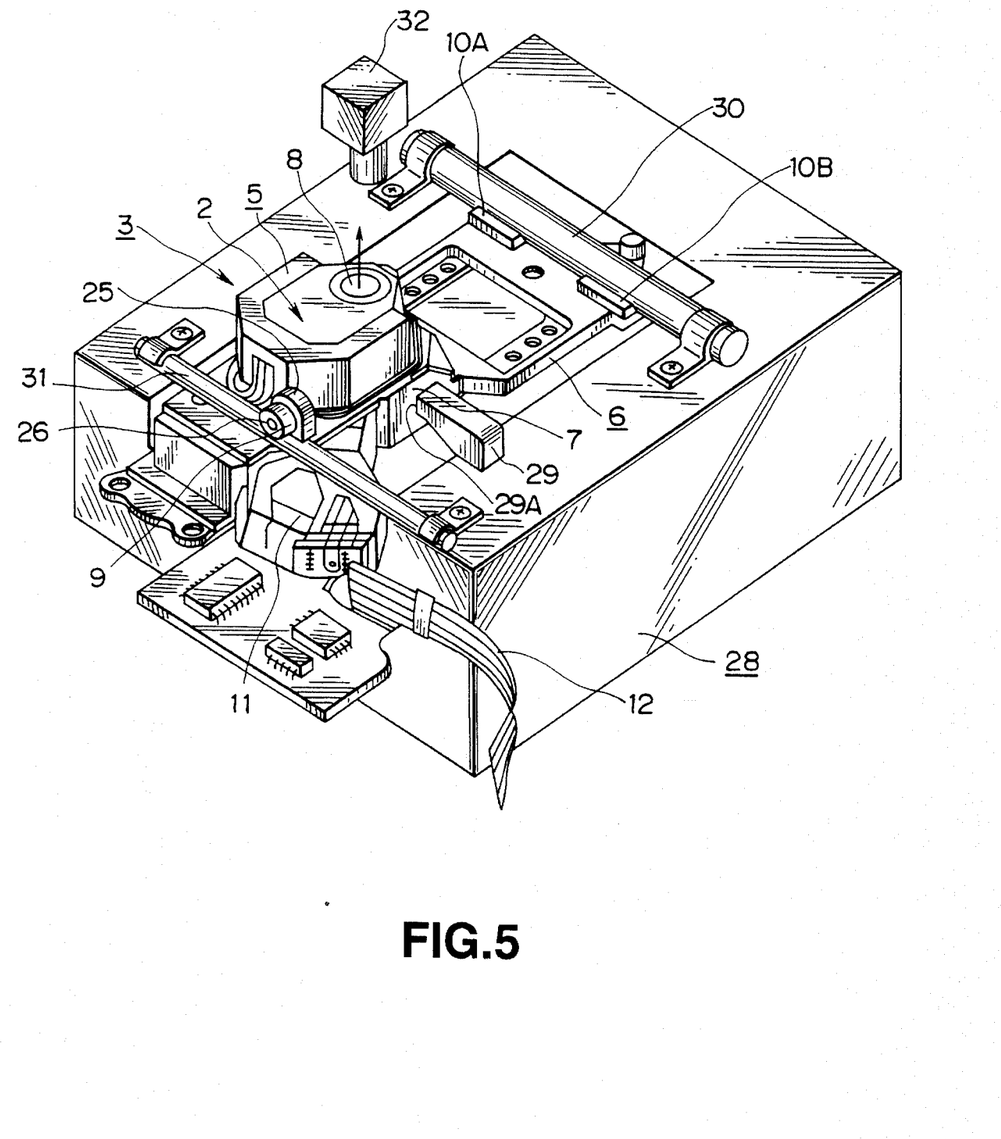
FIG. 5 is a perspective view showing an optical pickup device mounted on an adjustment jig.

These adjustment operations are carried out using a dedicated adjustment jig 28 on the production line, as shown in FIG. 5. This adjustment jig 28 has its own reference surface, and is made up of a main guide shaft 30 for supporting a pair of the sleeve mounting portions 10A, 10B of the mounting base 6 and a sub-guide shaft 31 for supporting the roll bearing 9. The optical pickup device 3 also has an adjustment mechanism by means of which the bobbin 5 may be moved through 360 in a plane extending normal to the optical axis of the objective lens 8 with the light-collecting point of the objective lens 8 as the base point. For adjustment, the bobbin 5 is finely adjusted in its position or tilt, while the above-described supporting state is maintained by an adjustment television camera 32 provided with a high precision at a pre-set distance from a reference surface 29A of a pickup stop member 29, and the reference surface 7 of the mounting base 6 is caused to bear on the reference plane of the adjustment jig 28. After the end of the adjustment, the bobbin 5 is secured on the mounting base 6 for completing the assembling the optical pickup device 3. On completion of the optical axis alignment and skew adjustment operations, the optical axis and the reference surface 7 are maintained in the most precise relative position to each other in the present optical pickup device. Meanwhile, with the adjustment for optical axis alignment, adjustments are made for the optical axis direction, angle of tilt of the three spots, output of the outgoing light, precision in reflection of the outgoing light from the optical block at a right angle by an optical prism, a mounting position of the laser light source, precision in the return light or detector position.

The optical pickup device 3, thus assembled, is then assembled within the recording/reproducing apparatus 1 for the optical disc to provide the above-described constitution. On completion of assembling of the optical pickup device 3 in the recording/reproducing apparatus 1 for the optical disc, the reference surface 7 is arranged at a position of intersecting a straight line interconnecting the center of rotation of the spindle motor 23 and the optical axis of the objective lens 8 mounted on the bobbin 5.

Figure 6:
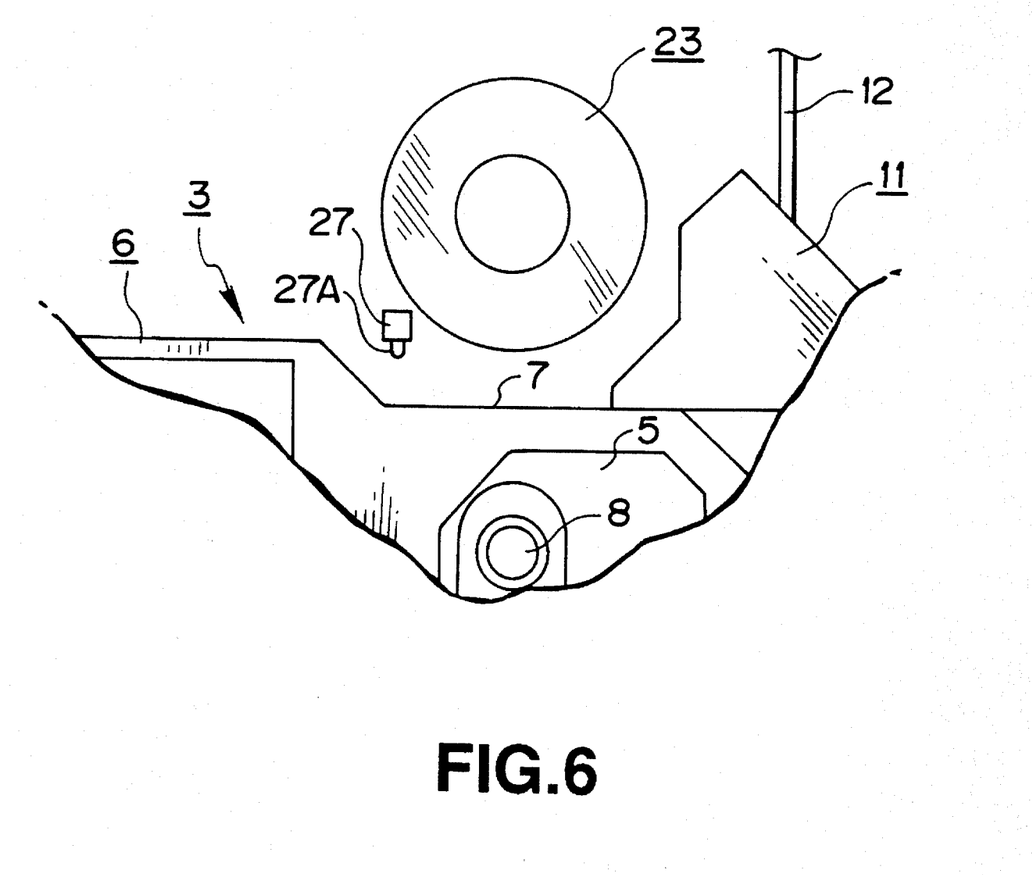
FIG. 6 is a plan view showing essential portions of the recording/reproducing apparatus shown in FIG. 3.

The chassis 21 has a substantially cylindrically-shaped stop member 14 of a metal material in the vicinity of the outer periphery of the spindle motor 23. The movement of the optical pickup device 3 is stopped by the reference surface 7 of the mounting base 6 being caused to bear against the stop member 14.

Since the stop member 14 is formed of a metal material, the stop position of the optical pickup device 3 by the abutment of the stop member 14 against the reference surface 7 may be maintained with high accuracy. The stop member 14 may be provided with a buffer member or formed of an elastic material for reducing the shock produced on abutment thereof against the mounting base 6.

The bobbin 5 has the objective lens 8 and is supported for elastic deviation by a biaxial actuator. That is, the bobbin 5 has means for adjustment in the track direction which runs parallel to the signal recording region of the optical disc and in the focusing direction normal to the signal recording region.

With the above-described constitution of the recording/reproducing apparatus for the optical disc, the operation of reading out information signals of the optical disc by the optical pickup device 3 is explained. The recording/reproducing apparatus 1 for the optical disc causes the optical pickup device 3 towards the inner rim of the optical disc along the guide shaft 15 and the guide member 16.

When the optical pickup device 3 has been moved as far as the inner most portion of the signal recording region of the optical disc, the reference surface 7 formed on the mounting base 6 is caused to bear against the stop member 14 provided on the chassis member 21. The movement of the optical pickup device 3 ceases by the reference surface 7 being caused to bear against the stop member 14.

The optical pickup device 3 starts its movement with the position of abutment of the reference surface 7 against the stop member 14 as the reference position from which the optical pickup device 3 is to be moved to the write or readout start position for the information signals. That is, the optical pickup device 3 reaches the write position or readout start position by being moved a pre-set distance from this reference position.

With the above-described embodiment of the recording/reproducing apparatus for the optical disc, since the optical axis of the objective lens 8 and the reference surface 7 provided on the mounting base 6 are maintained in the extremely precise relative position, the readout start position for the information signals in the signal recording region may be detected with high precision by shifting the optical pickup device 3 based upon the position of abutment of the reference surface 7 against the stop member 14 provided on the chassis member 21 as the reference position.

In addition, the distance between the optical axis of the halted optical pickup device 3 and the center of rotation of the spindle motor 23 may be improved in precision by the abutment of the reference surface 7 of the mounting base 6 against the stop member 14 provided on the chassis member 6.

In the above-described recording/reproducing apparatus for the disc-shaped recording medium, the stop member 14 abutted by the reference plane 7 of the mounting base 6 is provided on the chassis member 21. However, the chassis member 21 may also be provided with a position detection unit 27 having an retractable lug 27A for detecting the position to which the optical pickup device 3 and/or the mounting base 6 has been moved, as shown in FIG. 8. In such case, the reference surface 7 may be employed for abutting against and retracting the lug 27A of the position detecting unit 27 for actuating the latter.

Although the recording/reproducing apparatus for the optical disc of the above-described embodiment employs the CD-R as the optical disc, this is not limitative and may employ a CD-ROM as an example.

What is claimed is:

1. A method for controlling the position of an optical pickup device in a recording/reproducing apparatus for a disc-shaped recording medium, said method comprising the steps of:

forming a reference surface parallel to the optical axis of an objective lens on a lateral surface of a mounting base;

aligning and adjusting the array and tilt of an optical axis of the objective lens with the reference surface of the mounting base being abutted against a reference surface of an adjustment jig;

mounting a bobbin with the objective lens assembled thereon, on the mounting base, after the aligning and adjusting step for assembling the optical pickup device;

mounting the optical pickup device relative to a guide shaft and a guide member of a chassis member so that the optical pickup member is movable across the inner and outer peripheral portions of a signal region of the disc-shaped recording medium for assembling the recording/reproducing apparatus;

abutting the reference surface of the mounting base against a stop member provided on the chassis member, when the optical pickup device has been moved to the inner most region of the signal recording region of the disc-shaped recording medium, for stopping movement of the optical pickup device and providing a reference position from which said optical pickup device is to be moved;

detecting the reference position of said optical pickup device; and moving said optical pickup device a pre-set distance from said reference position to a discrete write position or readout start position for reading out information signals on the disc-shaped recording medium.

2. A recording/reproducing apparatus for a disc-shaped recording medium comprising:

a driving motor for running a disc-shaped recording medium in rotation;

an optical pickup device having an objective lens, a bobbin having the objective lens assembled thereon, a mounting base having a reference surface parallel to said optical axis for adjusting the array and tilt of the optical axis of the objective lens and a driving part for driving the mounting base;

a chassis member carrying said optical pickup device for moving the optical pickup device across the inner and outer peripheral portions of the signal recording region of the disc-shaped recording medium via a guide shaft and a guide member;

said chassis member having a stop member abutted by the reference surface of the mounting base when the optical pickup device has been moved to the inner most region of the signal recording region of the disc-shaped recording medium for stopping further movement of the optical pickup device and for providing a reference position from which said optical pickup device is to be moved;

means for detecting the reference position of said optical pickup device; and means for moving said optical pickup device a pre-set distance from the reference position to a discrete write position or readout start position.

3. The recording/reproducing apparatus for a disc-shaped recording medium as claimed in claim 2, wherein the reference surface is used as means for detecting the inner most peripheral portion of the signal recording region of the disc-shaped recording medium by abutting against said stop member provided on said chassis member.

4. The recording/reproducing apparatus for a disc-shaped recording medium as claimed in claim 2, wherein the reference surface is provided at a position of the mounting base which intersects a line interconnecting the center of rotation of the driving motor and the optical axis of the object lens mounted on the bobbin.

5. The recording/reproducing apparatus for a disc-shaped recording medium as claimed in claim 2, wherein the reference surface acts as an actuating part for retracting a lug adapted for actuating a position detecting unit detecting the position of the mounting base.

6. The recording/reproducing apparatus for a disc-shaped recording medium as claimed in claim 2, wherein the stop member is provided in the vicinity of the outer periphery of a driving motor.

* * * * *